United States Patent Office 3,738,868
Patented June 12, 1973

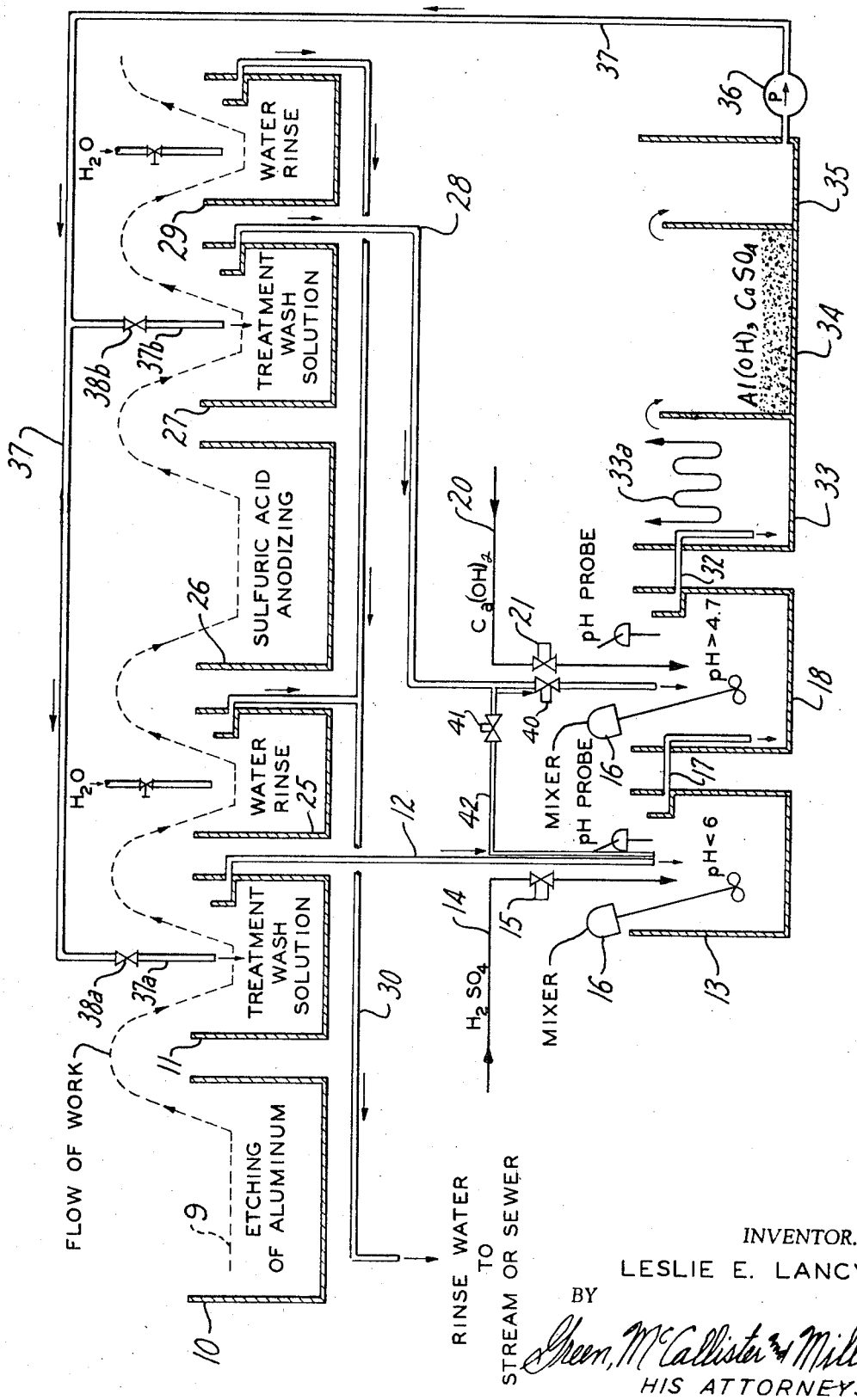

3,738,868
WASTE TREATMENT OF ALUMINUM CONTAINING SOLUTIONS
Leslie E. Lancy, Ellwood City, Pa., assignor to Lancy Laboratories Inc., Zelienople, Pa.
Continuation of abandoned application Ser. No. 8,173, Feb. 3, 1970. This application Jan. 7, 1972, Ser. No. 216,285
Int. Cl. B01d 21/01
U.S. Cl. 134—13                    19 Claims

ABSTRACT OF THE DISCLOSURE

The yield of dry solid content of sludge is greatly increased in proportion to the quantity of flocculent material by taking off dissolved aluminum containing wash water solutions from an aluminum processing line, reconditioning and returning the solutions as aqueous wash solutions to the line and reusing them in the line, and treating and neutralizing the taken off solutions to settle and periodically remove sludge therefrom. The economy of the operation and yield of the dry solids content in the sludge is further enhanced by providing a relatively low acid pH before neutralization of alkaline waste, by combining acid and caustic solutions for treatment, and by the application of heat.

CROSS-REFERENCE TO RELATED APPLICATIONS

This is a continuation of my U.S. application No. 8,173 filed Feb. 3, 1970 and entitled, "Waste Treatment of Aluminum Containing Solutions," now abandoned.

BACKGROUND OF THE INVENTION

Field of the invention

This invention relates to the treatment of aqueous waste solutions containing dissolved aluminum and particularly, to minimizing the amount of flocculent material and to maximizing the amount of dry solid material content settled out or precipitated from the solutions. A phase of the invention deals with a more efficient and effective separating out of aluminum sludge from an aqueous waste treatment solution with a minimization of the aluminum sludge volume.

Description of the prior art

After wet processing of aluminum, soluble aluminum compounds have to be precipitated out of the aqueous solution and separated from the clear supernatant. Aluminum hydroxide is recognized as an easily settleable and flocculent precipitate and has been used in water and sewage treatment applications by reason of such properties. However, for clarification of waste waters in metal finishing processes, a definite problem has arisen by reason of the existence of floc in the form of aluminum hydroxide. In aluminum processing or treating line, a significant quantity of the metal is dissolved from the surface and the precipitated hydroxide does not compress in settling, but remains in a flocculent condition and thus, occupies a great volume of space and creates a significant weight of waste sludge for disposal.

The molecular weight of aluminum is 26.97 while the molecular weight of aluminum hydroxide is 77.99, representing a ratio of about 1 to 2.89. One gram of aluminum precipitated as the metal hydroxide in one liter of waste solution, either from aluminum sulfate or from sodium aluminate, will occupy a volume space of about 600 ml. even after three hours of standing. Since the dry weight of the precipitated aluminum hydroxide is about 3 grams and the total weight of the 600 ml. of sludge is about 600 grams, the dry weight in the total sludge is only .5%. From a practical standpoint, this means that for each unit of weight for example, for each pound of aluminum, 600 pounds of sludge have to be dealt with before it is dewatered or dried. The problem is further complicated from the standpoint that in metal finishing of aluminum, for example in anodizing, it can be assumed that an average of 1 to 2% of the aluminum is dissolved away in the process. Thus, employing the same unit figures, a plant that is processing 1000 pounds of aluminum per day, per week or per month has to dispose of significant quantities of sludgey waste. Two percent of 1000 pounds of aluminum processed provides 20 pounds of aluminum which, according to the above calculations, will create 12,000 pounds of sludge.

Also, a great quantity of aluminum is dissolved in metal etching systems such as used in so-called chemical milling. Airplane frames are shaped by a chemical milling process and the metal removed may easily reach a figure of 1000 pounds per day. The two most common chemical processing solutions that attain high concentrations of aluminum in aluminum finishing systems are:

(A) A so-called basic aluminum etch containing free caustic soda that is continuously and slowly being enriched by aluminum which is dissolved from the surface of the metal workpiece and which is maintained until the aluminum concentration reaches a relatively high level at which time the solution may be dumped and a new one made up. Such a solution will contain aluminum in a range of 50 to 120 g./l. at the time it is being dumped, with a free caustic soda content of about 30 to 50 g./l. (NaOH). The aluminum is in the form of sodium aluminate, the basic hydroxide of aluminum.

(B) The second most common solution is an acid utilyizing anodizing solution made up of about 250 to 300 g./l. of sulfuric acid. After the aluminum content has increased, the solution has to either be dumped and renewed or some portion dumped and a new acid solution added to hold the aluminum concentration within a range of about 30 to 45 g./l.

Wash waters applied to a workpiece following either of the processes A or B contain the film that is dragged out from the process solution on surfaces of the workpiece which has been washed-off by the operation. The wash water usually contains considerably less and never more than about 1% concentration of the process solution. On neutralization of such used dissolved aluminum containing wash water, the aluminum hydroxide precipitates as a flocculent precipitate which is not easily compacted, compressed or thickened in any known manner.

By way of example, a 1% solution of an aluminum etch solution of which the original etch solution contained 120 g./l. of aluminum and 30 g./l. of free NaOH, has about 1.2 g./l. of aluminum. Neutralizing this solution to a pH of about 7 to 7.5 with a mineral acid, such as sulfuric, produced a measured precipitated volume of sludge in a one liter graduated cylinder that, after one hour, represents a settled sludge of 94% or 940 ml. of sludgey liquid. This sludge further settled after twenty-four hours to 40% volume of the initial one liter of neutralized waste solution. This indicates that the neutralized wash water, after an aluminum etching processing, will create a sludge volume of 940 grams of wet sludge containing 1.2 grams of original aluminum content. Even after twenty-four hours of holding for each 1.2 grams of aluminum in the waste water, there are 400 grams of sludge waste.

Since the original 1.2 grams of aluminum has formed about 3.5 grams of aluminum hydroxide, on a dry solid basis, the 940 grams of sludge contains .37% dry solids, and sludge even after twenty-four hours of settling, will contain less than 1% (.86%) dry solids. A twenty-four hour settling period is economically not attainable, and the sludge cannot be removed in settling without pumping some additional water from the supernatant liquid when attempting separation.

SUMMARY OF THE INVENTION

I have importantly discovered, however, that in comparison with the large sludge volume attained by neutralization of wash waters when working with a dilute concentration of aluminum solution, the situation is entirely different when neutralizing the concentrate, itself. That is, it was discovered that by only slightly diluting an original etch solution to provide one containing two parts of concentrated etch and one part of water, with the new solution having a concentration of about 90 gl./l. of aluminum and neutralizing such waste with sulfuric acid to a pH value of 7 to 7.5, produced a total sludge of 98% of the one liter solution. This indicates a content of about 270 grams of aluminum hydroxide in one liter volume of sludge or 27% dry weight in the treated wet sludge. This proved to be an important key to a solution of the problem.

It has been an object of the invention to solve the problem presented from the standpoint of the large volume of aluminum floc or sludge in a waste treatment solution as compared to the dry solid content thereof.

Another object has been to develop a process treatment and system for aluminum containing waste solutions and particularly, aluminum waste containing wash solutions.

Another object of the invention has been to develop procedure and means for economically utilizing, conditioning and reconstituting aluminum containing waste treatment wash solutions by concentrating or increasing the precipitated alumium content of flocculent sludge in such a manner as to effectively increase the dry solid content of the unit volume of sludge handled and to make practical the efficient reconditioning and continuous reuse of the wash solutions in aluminum workpiece washing operations.

A further object of the invention has been to effectively decrease the ratio of flocculent sludge content to dry solid content of an aqueous aluminum waste solution.

A further object of the invention has been to devise a controlled treating, neutralizing and precipitating procedure for dissolved aluminum in an aqueous aluminum wash treatment solution.

A still further object has been to increase the ratio of dry solid content in the flocculent sludge volume of an aqueous aluminum waste solution.

These and other objects of the invention will appear to those skilled in the art from the description thereof and the illustrated embodiments.

BRIEF DESCRIPTION OF THE DRAWINGS

The drawing is a somewhat schematic layout illustrating an in-line processing system employing a more sophisticated phase of the invention herein disclosed.

DESCRIPTION OF THE PREFERRED EMBODIMENT

In carrying out the invention, an important discovery was made from the standpoint of an aqueous caustic or alkaline etch waste solution of the A type and from the standpoint of an aqueous acid anodizing waste solution of the B type that the ratio of dry sludge content to wet sludge volume could be materially increased when neutralizing either of the solutions by increasing the precipitated aluminum concentration thereof. This is important since aluminum processing lines very often contain both an aluminum etching bath or station, and a subsequent aluminum anodizing bath or station, with the drag-out and thus the wash solution of each having a dissolved aluminum content. Precipitation occurs from the standpoint of aqueous waste solution take off upon the addition of a neutralizing chemical, which in the case of a caustic carryover wash solution will be an inorganic acid and, in the case of an acid carryover wash solution, will be an earth metal alkali, such as calcium oxide or hydroxide. Another advantage was found to result from the standpoint that by combining two opposite types of waste solutions, they can in a sense react with each other in effecting neutralization, thus minimizing requirements for the additional chemicals. Also, importantly, combining such opposite types of wash water solutions enables an increase in concentration of the precipitated aluminum content to thereby lower the ratio of sludge volume to dry solid content resulting from neutralization.

Further, as to increasing the dry solids content, an important discovery was made that it is practical and highly advantageous to reconstitute and reuse the aqueous waste wash solutions and, that it could be accomplished to increase the aluminum concentration of the reused solution which is returned for neutralization, while at the same time, conserving the chemicals and wash water. Importantly, it was determined that an aqueous solution for washing off drag-out from surfaces of a workpiece, as reconstituted by neutralizing a previously used aqueous waste wash solution, may be applied after neutralization without adversely affecting the finish of the workpiece in process, and that any residual precipitated aluminum hydroxide that may be carried back by the reconstituted solution will not adhere and can easily be removed after the workpiece has been rinsed. The process can be operated on a continuous basis with a continuous taking off of waste wash water, neutralizing and reconstituting it, and returning and reusing it in a washing bath or as a washing spray on the workpiece for removing both caustic and acid types of drag-out.

By way of example, doubling the aluminum etch solution addition to one liter of total rinse water by slowly accumulating precipitated aluminum with constant neutralization to a pH 7 with sulfuric acid, resulted in a sludge volume after one hour of settling of only 90%. This is surprisingly less than the sludge volume noted when neutralizing only ½ as much aluminum in the manner previously outlined. After twenty-four hours, the waste had further compacted to 63% sludge which indicates a 25% reduction in total sludge volume and a comparable increase in dry solids in the sludge. The used wash water as reused and continuously neutralized and reused will not damage or adversely adhere to the workpiece. It serves as a means of enriching the solution with fresh aluminum solution waste and of providing an increase in dry solid weight content of precipitated and settled out sludge.

As above indicated, the principles of the invention were found to be applicable to a processing cycle involving an aluminum anodizing operation, although the waste wash water in the latter situation is acid in nature rather than alkaline. It was determined that when neutralization occurs as to the aluminum content from either an A or B type of solution, the precipitate is aluminum hydroxide which will increase slowly in sludge volume and much more in dry solid content as the rinse solution is used over and over again. By adding caustic soda or lime to a type B waste solution to attain neutrality for the wash water reuse, the same desirable results are attained from the standpoint of total sludge volume per gram of aluminum waste and at the same time, the dry solid content of the sludge is increased to a practical content of at least 1.5% or higher. Vacuum filtration or centrifugation of the dry solids in a sludge becomes economical and suitable where the dry solid content reaches about 1.5%.

In an exemplary utilization of 20 liters of chemical rinse solution, designated as example C, slow and periodic additions of caustic etch solution were added in increments. The caustic etch solution contained 120 g./l. of aluminum and 30 g./l. of free NaOH, while the anodizing solution contained 30 g./l. of aluminum and 300 g./l.

of sulfuric acid. The purpose was to test the procedure from the standpoint of the combined utilization with solutions of the two types represented by A and B. After each addition of the caustic etch and anodizing solutions was addition to caustic etch solution, the pH was adjusted to neutrality using a sulfuric acid solution, and after each addition of the acid acidizing solution, the pH was adjusted by the addition of hydrated lime. Each increment made to simulate the quantity of drag-in that has been determined could occur in a 20-liter chemical washing. Each wash water was used and recirculated from the two process steps to remove the drag-over process solution film remaining on the workpiece. The combined waste solution thus produced was recirculated at the rate of 300 ml. per minute as reconstituted wash water for workpieces, combined respectively from a caustic etching solution treatment bath and a sulfuric acid anodizin treatment bath. A neutral pH of about 7 was maintained with the chemical additions.

In example C, the total aluminum added to the 20-liter recirculated chemical rinse solution was 60 grams or 3 g./l. After the total additions were made from the standpoint of 3 g./l. of aluminum from the etching waste solution and also to the anodizing waste solution, with periodic neutralization, the sludge volume was measured and found to be 85% by volume. The chemical wash solution thus constituted was kept in recirculation overnight. It was determined that even through the recirculation acted to stir precipitated flocculent aluminum hydroxide, that the sludge was compacted to 55% by total volume, indicating about 9 grams of dry weight of aluminum hydroxide in each 550 ml. of sludge volume, or a dry weight concentration of 1.98% (better than 1.5%). The 3 g./l. of aluminum simulates the drag-out from an etching solution, such as occurs when a workpiece is processed carrying an adherent film. Drag-out was also simulated by adding increments of an anodizing process solution to thus provide conditions prevailing where the workpiece is passed through both an alkyline etch solution and an acid anodizing solution and carries a wet drag-out film from each which cannot be discharged into the sewer system.

Further improvement was attained in reducing the sludge volume and thereby increasing the dry weight of aluminum hydroxide in the sludge by heating the chemical rinsing solution above an approximate room temperature of 75° (preferably, to a minimum of about 100° F.) through a range of up to about 180° F., and maintaining a temperature of about 135° to 145° F. while recirculating the solution. Sludge volume was reduced from 55% to 34.4% of the total volume, with an indicated 2.71% weight of dry solid content.

Further work along these lines disclosed that sludge volume that is generated by neutralization of an aluminum etch (alkaline) solution was always greater than the sludge volume generated from neutralization of an anodizing (acid) solution, possibly due to the fact that the aluminum hydroxide precipitates in a different form or because the aluminum hydroxide, as precipitated occludes some sodium aluminate and is not pure aluminum hydroxide. An important further advance was made by first acidifying an aluminum caustic etch wash solution addition for the reconstituted chemical wash solution with a mineral acid, such as sulfuric to a pH of below 6 to about 4, before neutralizing it with lime, $Ca(OH)_2$, followed by then neutralizing the solution to a final neutral pH of about 6 to 7, as an optimum, but tested also to a higher final pH of about 8 to 9.

It was discovered that 3 g./l. of aluminum added to a waste wash water solution, as made acid before it was neutralized, created considerably less sludge than was attainable by simple neutralization. This discovery was important not only from the standpoint of further increasing the proportionate dry solid content of the sludge in the caustic etch waste wash solution, but also importantly from the standpoint of making such a solution as reconstituted approach in its final treated characteristics, a reconstituted waste wash solution obtained from an acid anodizing operation. This thus enables obtaining a reconstituted solution from either type of washing operation that, as reconstituted, will have the same character and that may be freely used as an aqueous wash solution for workpieces that have been subjected to either or both a caustic etch or an acid anodizing treatment.

Thus, employing a two step treatment for a caustic type of wash water solution, as compared to the single type of treatment in which the alkaline content is directly neutralized and where only 1.2 g./l. of aluminum was precipitated and the sludge volume after one hour was 94%, the resultant sludge volume utilizing 3 g./l. aluminum, a preliminary acid pH of about 4 and neutralization above a pH of about 6 (about 6 to 7), was only 95%. Settling tests with this type of treatment and neutralization of the chemical wash solution were conducted at various temperatures with the results as indicated in Table I. As hereafter indicated. Table I illustrates the percentage of sludge or floc present after the solution was held for a specified time and at a specified temperature.

TABLE I

| | Percentage after— | | | | | | |
|---|---|---|---|---|---|---|---|
| | 15 min. | 30 min. | 60 min. | 90 min. | 120 min. | 3 hrs. | 24 hrs. |
| (1) 75° F | 98.5 | 97.5 | 95 | 92 | 88.5 | 82.5 | 44 |
| (2) 100° F | | 92 | 82.5 | 68 | 62 | 56.5 | 42 |
| (3) 120° F | 97 | 87.5 | 73.5 | 61 | 58 | 53.5 | 39 |
| (4) 140° F | 86 | 71 | 56 | 53 | 50 | 46.5 | 35 |
| (5) 175° F | | 56 | 40.5 | 37 | | | 26 |

Another set of sample solutions was processed with the assumption that the chemical wash water solution would receive drag-out from both an aluminum etch treatment and from an anodizing treatment. Equal volumes of drag-out solution in 50 ml. increments from the etch wash solution and subsequently from the anodizing solution were used. After each addition, the etching wash water solution was neutralized with sulfuric acid and the anodizing wash water solution with calcium hydroxide to produce a final pH of 9. Determinations have indicated that raising the pH to about 6 to 7 gives the same results. The total addition to a 3-liter chemical treatment wash solution was 7.5 grams of aluminum or 2.5 g./l. of aluminum. The following Table II shows the sludge percentage for various test conditions:

TABLE II

| | Percentage after— | | | | | | |
|---|---|---|---|---|---|---|---|
| | 15 min. | 30 min. | 60 min. | 90 min. | 120 min. | 3 hrs. | 24 hrs. |
| (1) 75° F | 97.5 | 95.5 | 91 | 87 | 83 | | 42 |
| (2) 100° F. (10 min.) | 94.5 | 85 | 75.5 | 69.5 | 64 | | 37.5 |
| (3) 120° F. (10 min.) | 84 | 67.5 | 58 | 53 | 49 | | 36 |
| (4) 140° F. (10 min.) | 71 | 49 | 42.5 | 40 | 38 | | 32 |
| (5) 160° F. (10 min.) | 67 | 49 | 42.5 | 39.5 | | | 34 |
| (6) 180° F. (10 min.) | 64.5 | 49 | 41.5 | 39 | | | 32.5 |

Recognizing that the chemical treatment wash water works best if the drag-out from a caustic etching solution is first acidified before it is lime neutralized, and that the drag-out from the acid anodizing solution need only be lime neutralized to produce comparable improved results, an additional test series was conducted. Equal volumes of etching and anodizing solutions in 50 ml. increments each were added to a 3-liter chemical wash water solution of the previously mentioned type. Then the pH of the combined solution was reduced to about 2.5 after each addition of the aluminum etch wash water solution, followed by thereafter neutralizing with lime, both the etching solution and the anodizing solution, all to a pH of 9. Determinations have indicated that no better results are obtained than where the pH is reduced to about 4 rather than below it. Considering that the total aluminum in the three liters of chemical rinse solution was 7.5 grams of aluminum or 2.5 g./l. of aluminum, tests indicated that the sludge volumes resulting were as follows:

TABLE III

|  | Percentage after— | | | | | | |
| --- | --- | --- | --- | --- | --- | --- | --- |
|  | 15 min. | 30 min. | 60 min. | 90 min. | 120 min. | 3 hrs. | 24 hrs. |
| (1) 75° F | 45 | 27 | 26 | 26 | 26 |  | 26 |
| (2) 100° F. (10 min.) | 22 | 18 | 17.5 | 17.5 | 17 |  | 17 |
| (3) 120° F | 25 | 18 | 17.5 | 17 | 17 |  | 16.5 |
| (4) 140° F | 26 | 18.5 | 17 | 17 | 17 |  | 16 |
| (5) 160° F | 32 | 22 | 19.5 | 19 | 19 |  | 17.5 |
| (6) 180° F | 48 | 29 | 24.5 | 23 | 22 |  | 20 |

On further experimenting with a chemical wash to compare the advantages of preliminarily reducing the pH of the caustic etch wash water to about 4 before being neutralized, and in an endeavor to determine if neutralization to a pH of about 6 to 7 would be equally suitable, as compared to a pH of 8 or 9, additional experiments were conducted and have been labeled as IV, V and VI.

Aluminum neutralization has been found to be completed at a pH of about 4.7 and nearly all the aluminum is precipitated. Going to a pH of higher than 6 is wasteful of chemicals, but may be required from the standpoint of waste effluent discharge. From the standpoint of effective treatment of aluminum, a pH of 4.7 or higher is suitable, with 4.7 to 6 being a good range. Maintaining a pH of not more than 6 to 7 has the advantage that no free lime occurs in the solution that would tend to precipitate in the form of calcium carbonate on the workpiece when it is being rinsed or washed by the reconstituted solution.

The last mentioned experiments of IV, V and VI were carried out as before by adding to a three liter chemical treatment rinse solution equal volumes of etching and anodizing solutions in 50 ml. increments each, reduced the pH in systems V and VI to 4, but with no acidification being conducted in system IV. The total aluminum in the 3 liters was 7.5 grams or 2.5 g./l. of aluminum, with the sludge volumes the same as indicated earlier.

TABLE IV

[Recirculated treatment rinse, 3 liters, containing 2.5 g./l. aluminum; neutralized to final pH 6.8]

|  | Percentage after— | | | | | | |
| --- | --- | --- | --- | --- | --- | --- | --- |
|  | 15 min. | 30 min. | 60 min. | 90 min. | 120 min. | 3 hrs. | 24 hrs. |
| (1) 75° F | 99 | 98 | 97 | 94 | 91.5 | 87 | 62 |
| (2) 120° F | 98 | 96 | 92 | 89 | 86.5 | 79.5 | 60 |
| (3) 160° F | 97 | 94 | 89 | 85.5 | 83.0 | 76.5 | 59 |

TABLE V

[Recirculated treatment rinse, 3 liters, containing 2.5 g./l. aluminum. Fresh waste rinse water pH reduced to 4 before returning to the treatment reservoir and neutralized with lime to pH 6]

|  | Percentage after— | | | | | | |
| --- | --- | --- | --- | --- | --- | --- | --- |
|  | 15 min. | 30 min. | 60 min. | 90 min. | 120 min. | 3 hrs. | 24 hrs. |
| (1) 75° F | 63 | 41 | 38 | 38 | 36.5 | 35 | 35 |
| (2) 120° F | 51 | 35 | 34 | 34 | 34 | 34 | 33 |
| (3) 160° F | 42 | 34 | 33 | 33 | 33 | 33 | 32 |

TABLE VI

[Recirculated treatment rinse, 3 liters, containing 2.5 g./l. aluminum; neutralized with lime to pH 8, after previously having reduced pH to 4 before neutralization]

|  | Percentage after— | | | | | | |
| --- | --- | --- | --- | --- | --- | --- | --- |
|  | 15 min. | 30 min. | 60 min. | 90 min. | 120 min. | 3 hrs. | 24 hrs. |
| (1) 75° F | 58 | 39 | 36 | 35.5 | 35.5 | 35 | 35 |
| (2) 120° F | 40.5 | 34 | 33 | 33 | 32 | 32 | 32 |
| (3) 160° F | 46 | 45.5 | 44 | 43.5 | 43 | 43 | 42 |

Ideally, the invention makes possible combining waste wash water effluent emanating from processing in an aluminum treating line or finishing operation which utilizes either or both caustic (or acid) aluminum etching and acid aluminum anodizing solutions. Even if someone skilled in the art had the foresight to combine the ordinary wash waters of such a line and neutralize them as combined, the sludge produced on neutralization and settling cannot be compressed. As a typical example, it was found that the sludge content of rinse water effluent was about 18% and was reduced to not lower than 18%, even after twenty four hours settling. On filtration and weighing, such sludge shows a total dry weight of solids contained therein equal to only .17%. This illustrates the importance of recycling the waste water solutions in order to take advantage of the build-up of the precipitated aluminum content therein, which build-up fortunately is not lost but actually tends to remain about constant after the first recycling operation that involves a neutralization of the solution after a drag-out washing-off operation, a return of the solution as reconditioned and substantially absent of precipitate to the washing zone or bath, a reuse of the solution in the washing zone, a removal of the then aluminum enriched aqueous washing solution, and a neutralizing treament of the enriched solution.

In accordance with the invention therefor, the washing process for drag-out of workpiece treating solutions containing dissolved aluminum, usually at least about 7.5 g./l., involves the continuous use of washing water solutions that are utilized after reconditioning and recirculation to remove the aluminum-containing wet drag-out. Caustic or acid etch and anodizing solutions are used to dissolve aluminum and to, at the same time, electrolytically convert surfaces to an oxide film. The repeated reuse of wash water solutions continually brings into their content fresh dissolved aluminum for precipitation to thereby increase the dry solid aluminum content of the precipitated sludges and provide a solid weight concentration of better than about 1.5% thereof. Elevating the chemical wash solution to a temperature exceeding about 100° F., or at least heating up the sludge portion of the solution to such a temperature or higher, has been found to provide an additional compacting of the aluminum containing sludge and to improve the removal of dense sludge.

Further, in accordance with the invention, a used aqueous waste wash solution from a caustic washing zone, bath or tank and containing drag-out from a preceding treating bath having a significant concentration of free caustic soda of about 30 to 75 g./l., after being employed to remove the etch carryover or drag-out from surfaces of the workpiece, is thereafter taken from the wash bath or zone and first acidified to a pH of below 6 and down to an optimum of about 4 and then neutralized. After neutralization, the solid precipitates are then removed from the solution by settling out, after which the reconditioned used solution is made available for reuse as a washing solution, either or both for washing-off an anodizing or an etching drag-out on surfaces of workpieces.

Using calcium (alkaline earth metal) hydroxide for neutralizing acid waste water, as after an acid etch, and first providing it with a pH of below about 4.7, all the aluminum that was dragged into the wash water can be precipitated by subsequent neutralization. At the same time, no free calcium hydroxide remains in the solution if no excess of alkali is added, assuring that no lime precipitation can occur on surfaces of the workpiece that is being washed. Although the process has been developed into a maximum effectiveness and efficiency by employing a full scale treatment system or process, as illustrated in the drawing, it will be apparent to those skilled in the art that a continually used, reconditioned and reused washing solution can be employed in a wash tank or zone by periodically or intermittently adding the necessary chemicals to maintain the efficiency of the treatment and to overcome the chemical imbalance caused by drag-in of chemicals carried over on the surface of the workpiece from a previous treating process. The amount of chemical additions will depend on the total volume and nature of wash water available in a bath wash system, in comparison to the total work surfaces processed per unit of time, the type of drag-out that is being washed-off the workpieces, and the total chemical requirements, where, for example, one or multi-stage workpiece treatment steps are to be combined with recirculation.

In the system illustrated in the drawing, a workpiece 9 is shown adapted to move in line from left to right through a caustic (or acid) etching solution bath, tank or zone 10 and thence into and through and out of a treatment wash solution bath, tank or zone 11. It will be noted that overflow from the zone 11 is carried by return line 12 into a servicing or treatment tank or bath 13 of a reconditioning zone at which an inorganic acid, such as sulfuric acid, may be supplied through line 14 and control valve 15 to first convert the overflow representing the used aqueous waste wash solution from the zone 11 to an acid pH of less than 6, for better results of less than 4.7, and for optimum results, to a pH of about 4. An electric mixer 16 is shown extending into the tank or bath 13 and a pH probe is also shown for checking its attained pH.

Solution overflow from servicing bath or tank 13 moves through line 17 into a second servicing or treatment tank or bath 18 at which complete neutralization may be accomplished, although from a waste treatment standpoint, a pH of 4.7 allowing a full precipitation of aluminum may be sufficient. Since the second tank 18 is receiving acid wash water from wash zone 27 through return line 28, an alkaline earth metal hydroxide, such as calcium hydroxide, may be supplied through line 20 and control valve 21. The tank 18 also has a mixer 16 and a pH probe and is shown adapted to receive and mix overflow from the servicing tank 13 and from the wash treatment zone 27.

Following washing treatment in the tank, bath or zone 11, the workpiece 9 then moves through water rinse tank, bath or zone 25, and then into and through a sulfuric acid anodizing tank, bath or zone 26. On leaving the zone 26, the workpiece A is moved into and through treatment wash tank, bath or zone 27 which, like the zone 11 may be continuously supplied with reconstituted used aqueous washing solution, as moved along main return flow line 37 by pump 36. Branch line 38a supplies the used aqueous wash solution through control valve 39a to zone 11, and branch line 38b and control valve 39b supply the used aqueous solution to the zone 27. The workpiece may then be moved from the zone 27 into a water rinse tank, bath or zone 29. Since the water from the rinse zones 25 and 29 is relatively low in contaminants, it may as shown, be discharged from overflows through pipeline 30 to a stream or sewer.

Treated solution from the second tank 18 moves through overflow pipe 32 into a heating tank 33 which is shown provided with a steam coil 33a to heat it to a temperature of at least 100° F. Thence, the heated solution, after a period of about ten (10) minutes heating in tank or bath 33, passes over an overflow into settling tank or bath 34 where it may be permitted to cool and where it may be fully reconstituted from the standpoint of the settling and removal of the aluminum containing sludge. The reconstituted used wash solution then moves into reservoir or holding tank 35 from which it may be supplied to the processing line. The drawing illustrates a typical recirculating system which desirably combines, reconstitutes and reuses the aqueous wash solutions from both alkaline and acid treatment stations of the processing line, and enables supplying replenished solution continuously or without fluctuations, either from the standpoint of supply or pH. pH fluctuations may be eliminated by supplying sufficient chemicals to overcome chemical fluctuations of the returning waste wash solutions. Preferably, the separation will not only be accomplished in a manner to effect a reuse of the wash solutions containing dissolved aluminum, but also to first or preliminarily acidify the solution as it comes from a caustic or alkaline station before neutralization, in order to provide a maximum content of dry solids or ratio of dry solids to floc.

Summarizing briefly, improved results are obtained by avoiding simple neutralization and discarding of wash waters, following either a caustic or an acid processing treatment of aluminum. In this way, the normal high sludge or floc volume to below 1.5-gram dry solid content is avoided. In accordance with the invention, wash waters are neutralized and recirculated with a resultant improvement represented by a reduced sludge volume of about ⅓. In other words, about 3 grams of dissolved aluminum now made available in the solution will give about the same amount of sludge as about the 1.2 grams originally did. Under conditions of a simple neutralization in which the wash waters are thereafter discharged and not recirculated, the dry solid content of the sludge is in the range of about .17 to .5%, but on the other hand, employing neutralization after recirculation, the dry solid content is increased above about 1.5%. This recirculation process is labelled Phase A of the invention.

Phase B of the invention rests upon the discovery that both caustic and acid waste wash waters produced by washing an aluminum workpiece in a processing line, such as the continuous line of the figure, can be combined to utilize their respective pH's to minimize the requirements for additions of neutralizing and reconditioning chemicals. Also, that such used combined waste wash solutions, as neutralized and reconstituted, can be recirculated and reused for washing-off both of acid and caustic solution drag-out or carryover on the surfaces of workpieces.

Phase C of the invention deals with the discovery that a further improvement in the ratio of dry solid content to sludge volume can be accomplished by reducing the pH of the used wash water in the nature of caustic wash water to first provide it with a low acid type pH that is at least below a pH of about 6 and, as an optimum, is about 4.

Finally, as to Phase D, it has been determined that improvement in the dry solid content can also be accomplished, utilizing the basic principles of the invention under Phase A, above, as well as those of phases such as B and C, in combination with raising the temperature of the solution at its neutralizing pH. The raised temperature is preferably held or maintained for a minimum period of ten (10) minutes to give equilibrium conditions that will prevail from then on. Settling or precipitation can then be effected without further heating, in order to avoid convection currents produced by heating from disturbing the settling characteristics. In a continuous production line process, although the heating may be continuous, it will be maintained at a suitable more or less stable level with settling being allowed in an area where no heat is being added. In this connection, the heat may be added, see tank 33, immediately prior to introduction of the used waste solution into settling or precipitating tank 34.

Utilizing the above-mentioned Phase C, if the waste or used wash water, as collected from washing baths or tanks has a pH of below 6 or below 4.7 and, as an optimum, of about 4, then improved results are assured, whether the waste solution has such a pH, or as treated or mixed has attained such a pH. Neutralization may then be immediately effected at a pH of about 4.7 and above, up to about 6 to 7. The lowering of the pH to about 4 or below for best results is, of course, only necessary where the pH of the solution being treated is higher than such a pH. A suitable operating range employs an initial acid pH of about 4 to below 6, with neutralization thereafter being effected by employing a pH of about 4.7 to 7; higher pH's of 7.5 to 9 are acceptable but result in higher chemical expense.

Table I illustrates the improvement that is attained under Phase A and also from the standpoint of further improvement attained from the use of temperatures above room temperature (above approximately 75° F.), employing Phase D above. Table II illustrates, as to item 1, thereof, the improvement under Phase A where a recirculated solution at room temperature is treated and held or settled for an indicated period of time. Items 2 to 6 of this table show the improvement obtained by utilizing a minimum ten minute holding time at specified temperatures and, after such temperature maintaining holding time by the use of a quiescent holding or settling time period. Table III illustrates the improvement attained by reducing the pH of the wash solution below a neutralizing starting point before it is neutralized; in this case, by lowering the pH to an acid pH of about 2.5. It has been determined, however, the improvement using an acid pH of about 4 before neutralization is the same; also, it has been determined that bringing the neutralization pH up to about 8 or 9 gives no further improvement over a pH of about 6 to 7. Table IV illustrates the improvement accomplished, even where the pH of the used water solution, following a caustic etch drag-out wash, was not acidified and dropped below an aluminum precipitating point (below a pH of 4.7), but where the process was carried out in accordance with Phase A above, from the standpoint of neutralizing a recirculated wash solution. Tables V and VI are further illustrative of the improved results obtained where the pH of a caustic wash water solution is reduced before neutralization.

Finally, it has been determined that the results cannot be improved by, for example, increasing the pH of an acid or anodized waste water solution and thereafter reducing it. It appears that the bringing of a caustic or alkaline waste water solution down past its neutralization pH causes some of the sludge to be redissolved; then bringing the acidified solution back into its neutralization range of pH, results in a much greater yield of dry solid as compared to sludge precipitate.

Where the anodizing zone or bath 26 makes use of a sulfur containing acid, sulfate is thus brought into the carry-over or drag-out on the surface of the workpiece and is thus washed-off and picked up by the treatment wash solution at 27. It has been found that the use of calcium in the conditioning of a sulfate containing wash waste solution for reuse will automatically limit the maximum amount of sulfate concentration that can be built up therein. It thus makes possible the continued reuse of the wash solution without too much enrichment of sulfate. The maximum concentration of sulfate is thus about 2.3 g./l. Although aluminum sulfate is the principal ingredient of the drag-out, the calcium precipitates the sulfate and the aluminum precipitates out as hydroxide, see container 34 of the drawings.

Using the process of the present invention, a treating line such as illustrated in the upper portion of the drawing can be utilized flexibly and economically. That is, during one period of the operation of the treating line, it may be desirable to only employ the etching solution of zone 10 and to omit passing the workpiece through the anodizing tank zone 26; in such an event, the treatment wash would only be applied in zone 11 to remove the alkaline carryover. During another period of the operation of the line, it may be desirable to only move the workpiece through the anodizing zone 26; in such an event, the treatment wash would be applied only in the zone 27 to remove the acid carryover. At another time and possibly the majority of the time, it may be desirable to subject the workpiece to both the etching of zone 10 and the anodizing of zone 26; in such an event, the workpiece will be washed for alkaline and acid carryover in the respective zones 11 and 27. Where both the etching and anodizing are being accomplished, it will be apparent that a saving may be effected from the standpoint of minimizing the requirements for adding additional alkaline hydroxide by, for example, mixing the two types of the used waste washing solutions before adding the chemicals. However, as previously emphasized, it is important in accordance with the invention to first provide the mixed waste solution with an acid pH of below about 6.0 and then subsequently provide it with a neutralizing pH of above 4.7 (see the drawing).

Although the process of the invention makes possible a continuous use and reuse of a given quantity of wash water solution, it will be apparent that fresh water may be added thereto periodically or at a slow continuous rate to replenish any losses occurring by reason of evaporation, sludge removal, etc.

In the drawing, means is shown for accomplishing the previously mentioned operation of directly mixing the used acid containing washing soluiton that is being taken off from the zone 27 with the used alkaline containing washing solution that is being taken off from the zone 11. In this connection, an auxiliary line 42 is shown leading from main line 28 to deliver the used acid containing solution into the servicing tank or bath 13 into which used alkaline washing solution is being simultaneously introduced through the pipe 12. Valve 40 in the line 28 enables the solution being taken off from the tank or zone 27 to be fully or partially shut-off from its flow into the second servicing tank zone 18, and the opening of a valve 41 in the auxiliary line 42 will then pass all or a portion of the solution from the line 28 directly into the tank 13 and thus into an initial mixing relation with the used alkaline containing solution therein. This enables a saving in the requirements for additional acid supplied through the line 14. It will be appreciated that the above is merely exemplary of means that may be employed for the stated purpose.

What is claimed is:

1. In an in-line process for reconditioning and settling a maximized amount of dry solid content of aluminum hydroxide from aqueous used rinse washing solutions of a process line, one of which solutions has been used at a washing zone for removing alkaline drag-out and the other of which solutions has been used at a washing zone for removing acid drag-out from surfaces of a workpiece being moved from preceding surface-treating zones of the line, the improvement comprising, removing the used washing solutions from the respective washing zones to a reconditioning zone and, at the reconditioning zone, reducing the used alkaline drag-out containing solution to an acid pH of below about 6 and mixing it with the used acid drag-out containing solution, adding an alkaline metal hydroxide to the mixed solution and raising it to a neutralizing pH of above about 4.7, substantially fully precipitating aluminum hydroxide from the soluble aluminum content of the thus-treated mixed solution, and then settling-out a maximum content of dry solids from the aluminum hydroxide precipitate of the mixed solution.

2. In an in-line process as defined in claim 1, the step of providing the mixed solution with a pH of above about 4.7 being accomplished within a range of pH of about 4.7 to 9.

3. In a process as defined in claim 1, after removing the dry solids from the mixed solution, reusing the solution with a residual aluminum hydroxide content as an aqueous rinse washing solution in the processing line.

4. In a process as defined in claim 3, after reusing portions of the aqueous rinse washing solution for removing alkaline and acid drag-out, removing the reused rinse washing solution portions to the reconditioning zone, and then repeating the defined treatment of the two portions thereof.

5. In an in-line process as defined in claim 3, adding calcium hydroxide as the alkaline metal hydroxide to the mixed solution and supplying it in a sufficient amount to substantially fully precipitate aluminum hydroxide from the soluble aluminum content of the mixed solution, and providing the thus-treated mixed solution for reuse without the presence of a free amount of calcium hydroxide therein.

6. In a process as defined in claim 1, first mixing the alkaline and acid containing used washing solutions, and providing the alkaline containing used washing solution with a pH of below about 6.0 by utilizing the acid content of the used acid solution and additional acid as needed.

7. In a process as defined in claim 1, assuring the provision of the alkaline containing solution with a pH of below 6.0 by the addition of a mineral acid thereto.

8. In a process as defined in claim 7, empolying sulfuric acid as the mineral acid that is added to the alkaline solution.

9. In a process as defined in claim 1, after removing the dry solids from the thus-treated mixed solution, reusing it indiscriminately as an aqueous rinse washing solution for the removal of both alkaline and acid drag-out from surfaces of a workpiece.

10. In a process as defined in claim 1 wherein the acid containing washing solution contains sulfuric acid and aluminum sulfate, at the reconditioning zone employing a calcium salt in the mixed solution to limit the maximum sulfate concentration thereof and to precipitate out aluminum hydroxide and calcium sulfate.

11. In a process as defined in claim 1, at the reconditioning zone, heating the mixed solution to which the alkaline metal hydroxide has been added to a raised temperature of at least about 100° F., and thereafter settling-out dry solids in the mixed solution.

12. In a process as defined in claim 11, maintaining the mixed solution at a raised temperature for a minimum period of about ten minutes, and thereafter introducing the mixed solution into a settling tank.

13. In a process as defined in claim 1, limiting the below about 6.0 pH of the alkaline containing solution to a minimum of about 4 before adding the alkaline metal hydroxide thereto, and providing the mixed solution with a pH within a range of about 4.7 to 9 by the addition of the alkaline metal hydroxide thereto.

14. In a process of conditioning and settling a maximized amount of dry solids content from a precipitated aluminum containing sludge in an aqueous washing solution that has been used in removing drag-out in the nature of a caustic treatment solution from surfaces of workpieces at a washing zone of a processing line, the improvement comprising removing the used washing solution from the washing zone, first reducing the pH of the used washing solution below about 6.0, then raising the pH and neutralizing the used solution, and settling out sludge from the used solution to reconstitute it for reuse.

15. In a process as defined in claim 14, the step of raising the pH of the used solution being accomplished within a maximum pH of about 9.

16. In a process as defined in claim 14 wherein the conditioning and settling of a maximized amount of dry solid content is also to be accomplished from a precipitated aluminum containing sludge in an aqueous washing solution that has been used in removing drag-out in the nature of an acid treatment solution from surfaces of workpieces at another washing zone of a processing line, the further improvement comprising, removing the used acid containing washing solution from the other washing zone, mixing the used acid containing washing solution with the used caustic containing washing solution and thereafter accomplishing the reduction of the pH of the caustic containing washing solution below about 6.0, and finally raising the pH and neutralizing the mixed solution before settling out sludge therefrom to reconstitute it for reuse.

17. In a process as defined in claim 16, providing the used mixed solution with a temperature of above about 100° F. before settling out precipitated sludge therefrom.

18. In an in-line process for conditioning and settling a maximized amount of dry solid content of aluminum hydroxide from an aqueous waste rinse washing solution that has been used in a washing zone of a processing line for removing treatment solution drag-out in the nature of an acid solution from the surfaces of a workpiece being moved from a preceding surface-treating zone of the line, the improvement comprising, removing a used waste acid washing solution from the washing to a reconditioning zone, at the reconditioning zone adding calcium metal hydroxide to the acid waste solution and neutralizing it at a pH of above about 4.7 heating the waste solution to a temperature of at least about 100° F. while substantially fully precipitating the aluminum hydroxide from the soluble aluminum content of the waste solution and settling out a maximum content of dry solids from the aluminum hydroxide precipitate in the waste solution, providing the thus-conditioned waste solution free of the calcium metal hydroxide, and thereafter reusing the conditioned waste solution by applying it free of the calcium metal hydroxide to a workpiece for indiscriminately removing acid and alkaline drag-out therefrom with in a washing zone.

19. In a process as defined in claim 18, thereafter removing the reused waste solution from the washing zone, and, after first assuring that it has an acid pH, thereafter repeating the defined treatment.

References Cited

UNITED STATES PATENTS

| | | |
|---|---|---|
| 2,228,026 | 1/1941 | Abrahams. |
| 2,541,901 | 2/1951 | Zademach et al. |
| 2,679,537 | 5/1954 | Knowlton. |
| 2,683,113 | 7/1954 | Prance et al. |

OTHER REFERENCES

Gurnham, C. F.: "Principles of Industrial Waste Treatment," 1955, pp. 104, 386, 387.

Weiner, R.: "Effluent Treatment in the Metal Finishing Industry," 1963, pp. 90, 91.

JOSEPH SCOVRONEK, Primary Examiner

D. G. MILLMAN, Assistant Examiner

U.S. Cl. X.R.

134—28, 29; 210—60